(12) United States Patent
Dwyer et al.

(10) Patent No.: US 8,166,818 B2
(45) Date of Patent: May 1, 2012

(54) USING POLE PIECES TO GUIDE MAGNETIC FLUX THROUGH A MEMS DEVICE AND METHOD OF MAKING

(75) Inventors: Paul W. Dwyer, Seattle, WA (US); Ryan Roehnelt, Kenmore, WA (US)

(73) Assignee: Honeywell International Inc., Morristown, NJ (US)

( * ) Notice: Subject to any disclaimer, the term of this patent is extended or adjusted under 35 U.S.C. 154(b) by 414 days.

(21) Appl. No.: 12/471,785

(22) Filed: May 26, 2009

(65) Prior Publication Data

US 2010/0242601 A1 Sep. 30, 2010

Related U.S. Application Data

(63) Continuation-in-part of application No. 12/412,241, filed on Mar. 26, 2009.

(51) Int. Cl.
*G01P 15/08* (2006.01)
(52) U.S. Cl. .................................................. 73/514.31
(58) Field of Classification Search ............... 73/514.31, 73/514.16, 514.29; 324/162–166, 173–174, 324/207.2, 207.21, 207.24
See application file for complete search history.

(56) References Cited

U.S. PATENT DOCUMENTS

| | | | |
|---|---|---|---|
| 5,067,351 A * | 11/1991 | Laughlin | 73/514.03 |
| 5,331,854 A | 7/1994 | Hulsing, II | |
| 6,736,009 B1 * | 5/2004 | Schwabe | 73/514.31 |
| 6,910,379 B2 | 6/2005 | Eskridge et al. | |
| 7,069,784 B1 | 7/2006 | Eskridge | |
| 7,253,609 B2 * | 8/2007 | Schmidt et al. | 324/164 |
| 7,480,983 B2 | 1/2009 | Lo | |
| 2006/0195305 A1 | 8/2006 | LaFond | |

* cited by examiner

*Primary Examiner* — Helen C. Kwok
(74) *Attorney, Agent, or Firm* — Lowe Graham Jones

(57) ABSTRACT

A translational, Micro-Electro-Mechanical System (MEMS) accelerometer device with precisely formed pole pieces to guide magnetic flux through a coil in a MEMS device layer. An example device includes a device layer, a magnetic return path component attached to a first side of the device layer, and a magnet unit attached to a second side of the device layer. The device layer includes a proof mass with electrically conductive trace and frame components. The magnet unit includes two magnetically conductive posts (formed of a ferrous material) located proximate to the trace, a base section formed of the same material as the posts, a non-magnetically conductive post (formed of a glass substrate) connected between the conductive posts, and a magnet attached to the non-magnetically conductive post within a cavity formed in the base section between the two magnetically conductive posts.

6 Claims, 6 Drawing Sheets

USING POLE PIECES TO GUIDE MAGNETIC FLUX THROUGH A MEMS DEVICE AND METHOD OF MAKING

PRIORITY CLAIM

This application is a Continuation-in-Part of U.S. patent application Ser. No. 12/412,241 filed Mar. 26, 2009, the contents of which are hereby incorporated by reference.

BACKGROUND OF THE INVENTION

A widely used Micro-Electro-Mechanical System/Sensor (MEMS) device for force detection and measurement employs a mechanical capacitive readout force accelerometer having a capacitive output proportional to the force applied. In one such accelerometer, one or more capacitors are formed on a proof mass suspended by one or more flexures in an instrument frame. A force applied to the proof mass along a particular axis will cause displacement of the proof mass relative to the frame. This displacement varies the capacitive output. The force applied to the proof mass is quantified by measuring a resultant change in capacitive output. Determining the applied force based on change in capacitance is known as open-loop operation.

By contrast, a closed-loop accelerometer achieves higher performance by using a feedback loop to cancel the movement of the proof mass, thus keeping the mass nearly stationary. Ideally, the capacitance output stays constant in the closed-loop accelerometer. To maintain a constant output, a proportional reaction force is generated to oppose the motion of the proof mass displaced from the neutral or zero displacement point when the proof mass is subjected to an action (external) force. Instead of using the change in capacitance to determine the action force applied to the mass, the action force is determined based on the reaction force necessary to maintain the proof mass in the neutral position. An example of a conventional (non-MEMS) closed-loop, flexure-type accelerometer is the Q-FLEX® manufactured by Honeywell International, Inc. Production of the Q-FLEX® is costly because production is performed one-at-a-time.

In other MEMS sensors the reaction force applied to the proof mass is generated using a magnetic field in combination with an electrical field. In such a device, the accuracy of the measurements outputted by the MEMS device depends on the properties of the magnetic field, in particular, the strength and uniformity of the magnetic field.

SUMMARY OF THE INVENTION

The present invention relates generally to a magnetic circuit used in a translational mass MEMS device. More specifically, the present invention relates to using precisely formed pole pieces to guide magnetic flux through a coil in a MEMS device layer.

An example translational, Micro-Electro-Mechanical System (MEMS) accelerometer device includes a device layer, a magnetic return path component attached to a first side of the device layer, and a magnet unit attached to a second side of the device layer. The device layer includes a proof mass having an electrically conductive trace (e.g., doped silicon) located on at least one side and one or more frame components. The magnet unit includes two magnetically conductive posts located proximate to the electrically conductive trace on the proof mass, a base section formed of the same material as the conductive posts, a non-magnetically conductive post connected between the conductive posts, and a magnet attached to the non-magnetically conductive post within a cavity formed in the base section between the two magnetically conductive posts. The two magnetically conductive posts and the base section are formed of a ferrous material and the non-magnetically conductive post is formed of a glass substrate.

In one aspect of the present invention, the magnetic return path component includes two magnetically conductive posts located proximate to the electrically conductive trace on the proof mass, a base section formed of the same material as the conductive posts, and a non-magnetically conductive post connected between the conductive posts. The two magnetically conductive posts and the base section are formed of a ferrous material and the non-magnetically conductive posts are formed of a glass substrate. The non-magnetically conductive posts are anodically bonded to predefined locations on the device layer.

In another aspect of the present invention, the glass substrates are Pyrex® and ferrous materials are Kovar®.

In still another aspect of the present invention, a top surface of the magnetically conductive posts is recessed from a plane of a top surface of the non-magnetically conductive posts.

BRIEF DESCRIPTION OF THE DRAWINGS

Preferred and alternative embodiments of the present invention are described in detail below with reference to the following drawings.

DETAILED DESCRIPTION OF THE INVENTION

Figure 1:
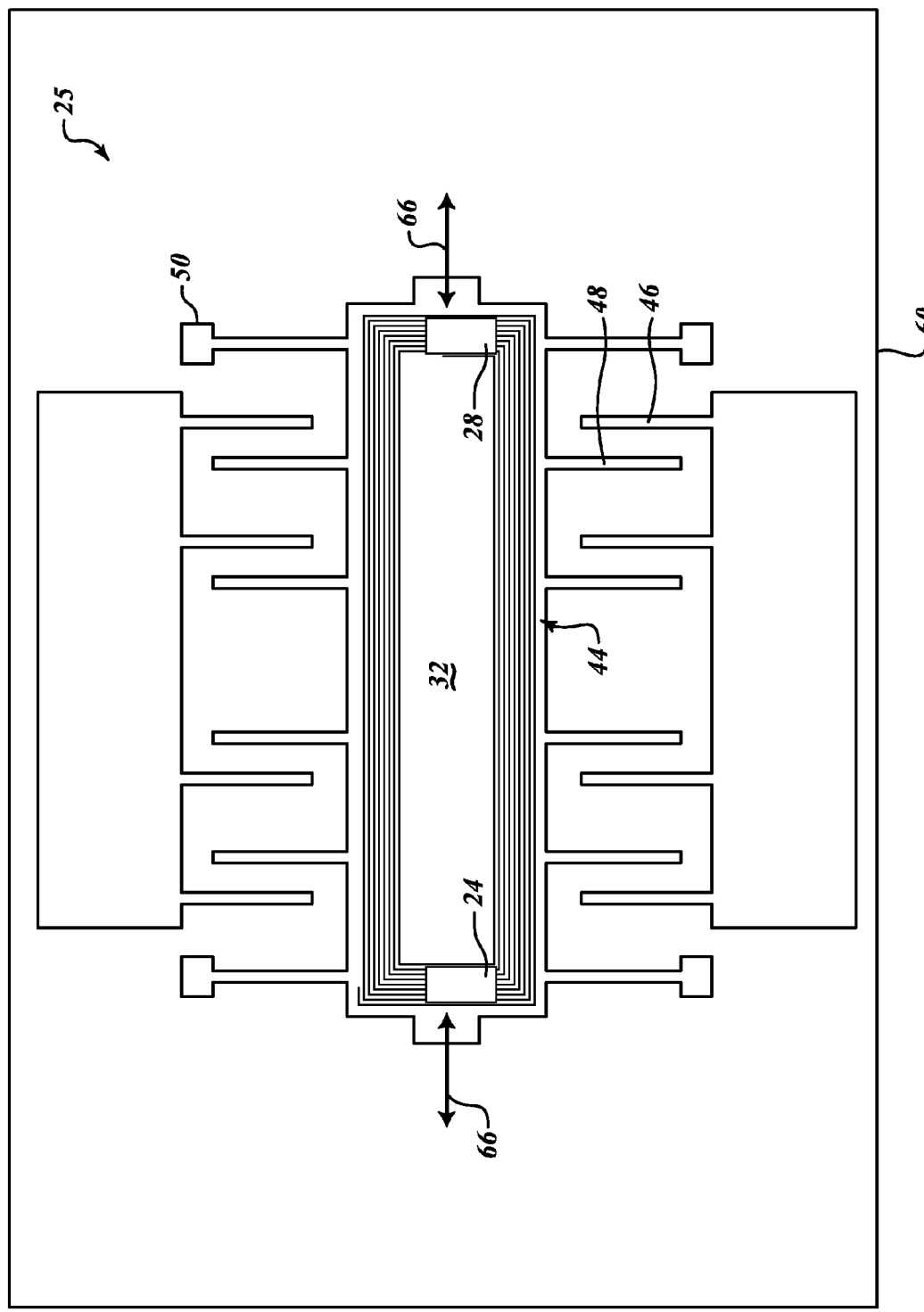
FIG. 1 is a top, x-ray view of a MEMS sensor formed in accordance with the present invention.

FIG. 1 shows a Micro-Electro-Mechanical System/Sensor (MEMS) sensor 60 having a magnetic rebalance drive. The accelerometer 25 includes a coil (i.e., an electrically conductive trace) 44 located on at least one side of a proof mass 32. Pole pieces 24, 28 are positioned above the coil 44. The coil 44 has a width that is preferably wider than the pole pieces 24, 28. The current in the coil interacts with DC flux produced by a magnetic circuit (that includes the pole pieces 24, 28 and a centrally located magnet (not shown)) to produce a force that opposes the applied acceleration.

The accelerometer 25 includes two types of combs: stator combs 46 and rotor combs 48. The rotor combs 48 are attached to the proof mass 32. The position of the stator combs 46 is fixed to a frame, while the proof mass 32 and rotor combs 48 may translate relative to the stator combs 46 by means of suspension flexures 50. The direction of translation is shown by arrows 66. A capacitive gap is formed between respective tines of the stator and rotor combs 46, 48. Comb teeth (not shown) that sense the motion of the proof mass 32 reside inside the coils and are perpendicular to the combs 46, 48. The combs 46, 48 provide damping and, if needed, electrostatic spring softening.

In a device utilizing a closed-loop design, the proof mass 32 is maintained in a neutral position, i.e. zero displacement by feeding back the effect of the displacement. The action (external) force applied to the proof mass 32 is determined based on the reaction force necessary to maintain the proof mass 32 in a null position. The force applied to the proof mass is generated by the interaction of a magnetic (DC) flux passing through the coil 44 at opposing ends of the proof mass 32 via the pole pieces 24, 28 and a current applied to the coil 44.

Figure 2:
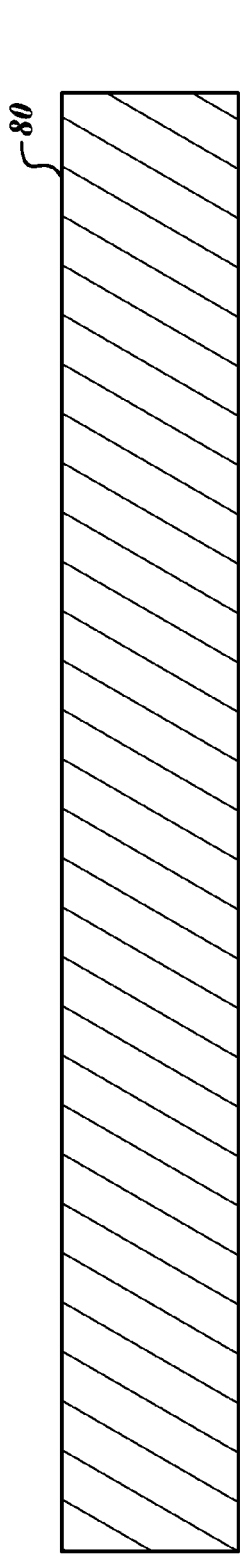
FIGS. 2-9 illustrate cross-sectional views of steps for generating magnetic pole piece return pass for a MEMS translational accelerometer.
Figure 3:
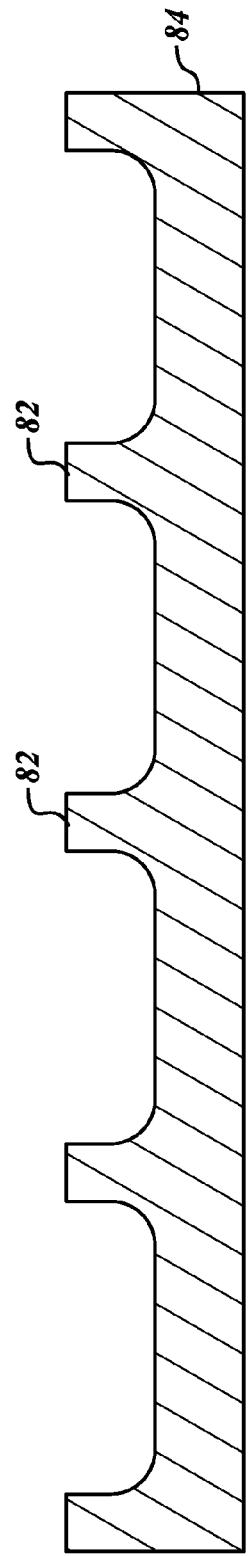

FIGS. 2-9 illustrate a method of making the sensor 60 shown in FIG. 1. FIG. 2 shows a cross-sectional view of a ferrous alloy substrate 80, such as an iron-nickel-cobalt, ferrous alloy (e.g. Kovar®). Next, as shown in FIG. 3, the substrate 80 is etched from a first side in order to produce a plurality of mesas 82 and a base section 84. The etching of the substrate 80 is a chemical etch process that performs an isotropic-type etch, thereby producing some curvature at a location between a base of the mesas 82 and a floor of the gap formed between the mesas 82.

Figure 4:
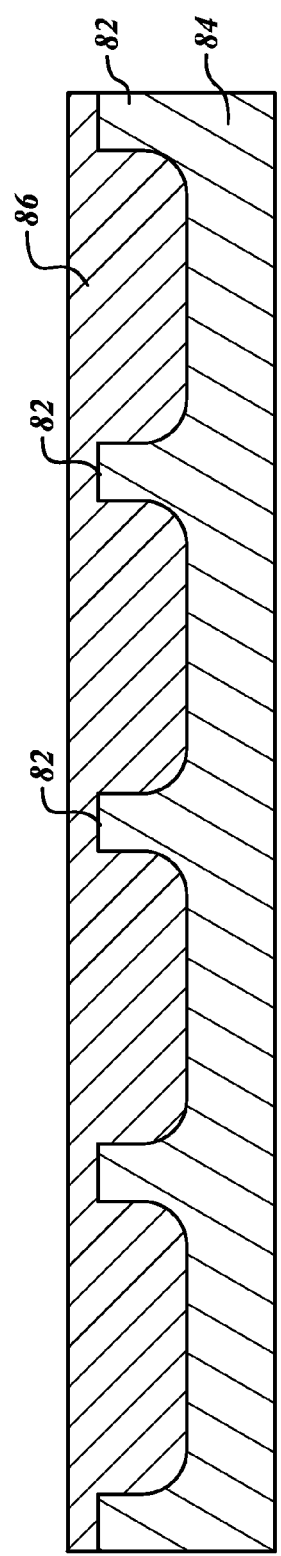
Figure 5:
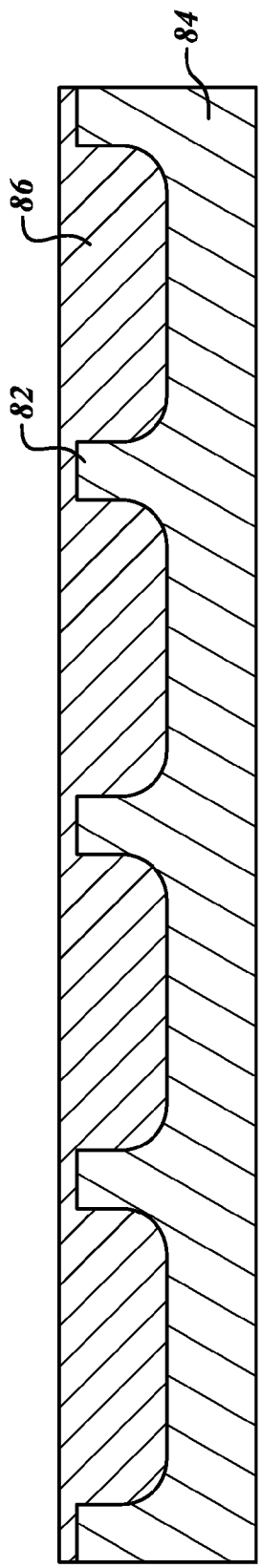

As shown in FIG. 4, a tempered soda lime glass or borosilicate glass material 86 (e.g. Pyrex®) is heated to flow into the gaps formed between the mesas 82. After the glass material 86 is slumped in and around the mesas 82, the glass material 86 is planarized to a predefined height above (2-20 µ) above the top edge of the mesas 82, see FIG. 5.

Figure 6:
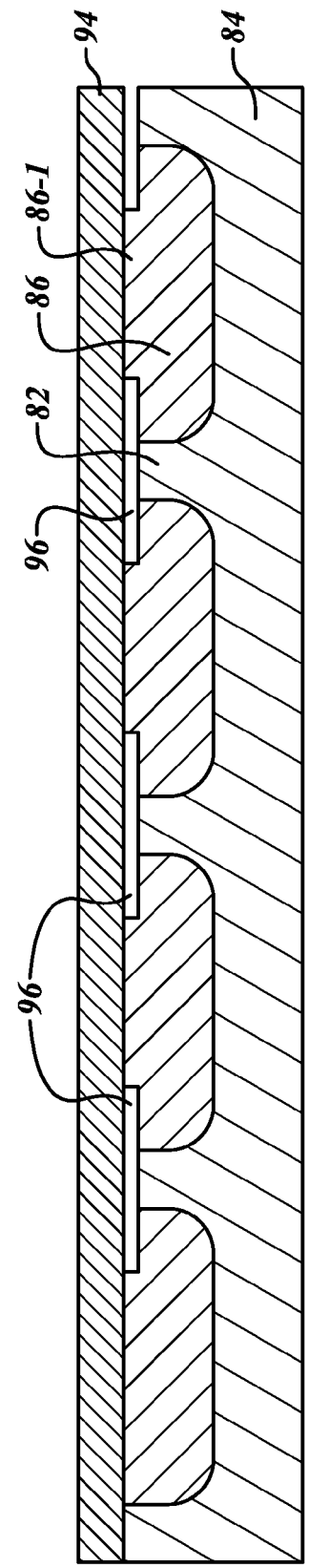

Next, as shown in FIG. 6, relief areas 96 are etched into the glass material 86 around the top surfaces of the mesas 82 and in an area that will eventually correspond to the proof mass 32 in a device layer. This produces glass material posts 86-1 that are then anodically bonded to frame components (e.g., stators) in a device layer 94. The device layer is bonded to the glass material 86 at the base of springs (not shown) mounted between the proof mass and frame of the device layer 94, the base of springs at either end of the device layer 94 and around the periphery of the proof mass (the frame) separated by a gap for allowing the proof mass to move.

Figure 7:
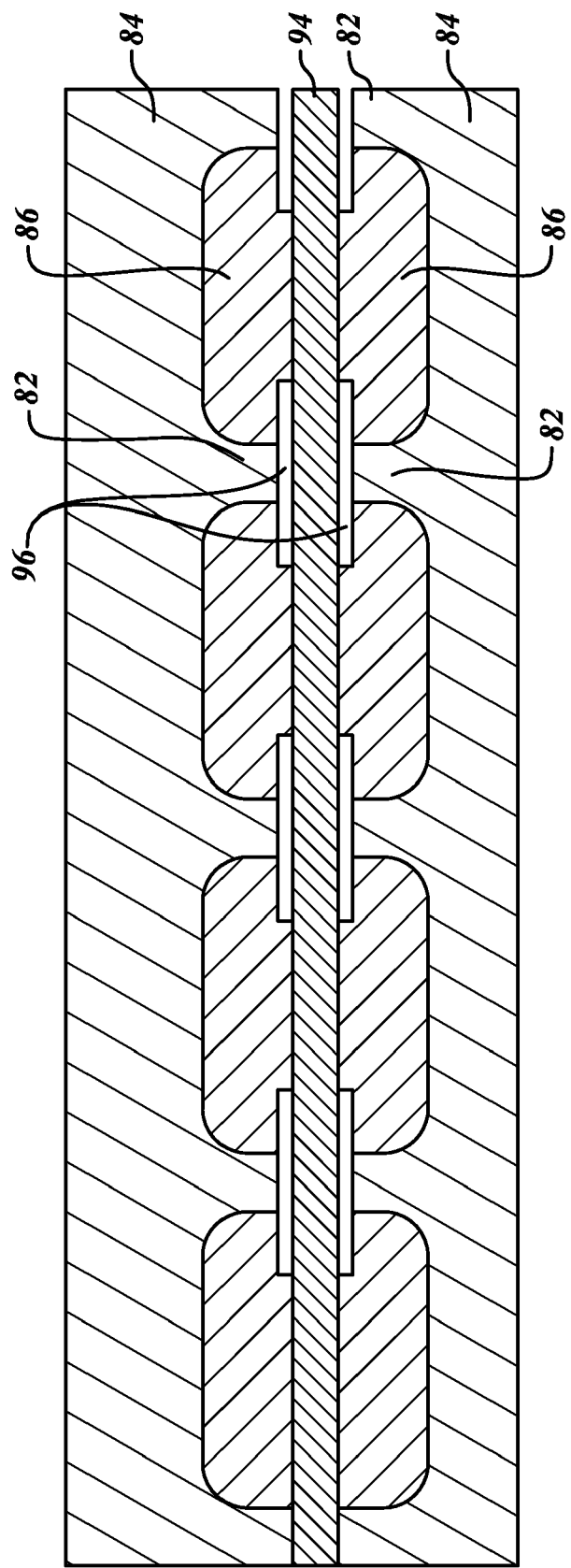
Figure 8:
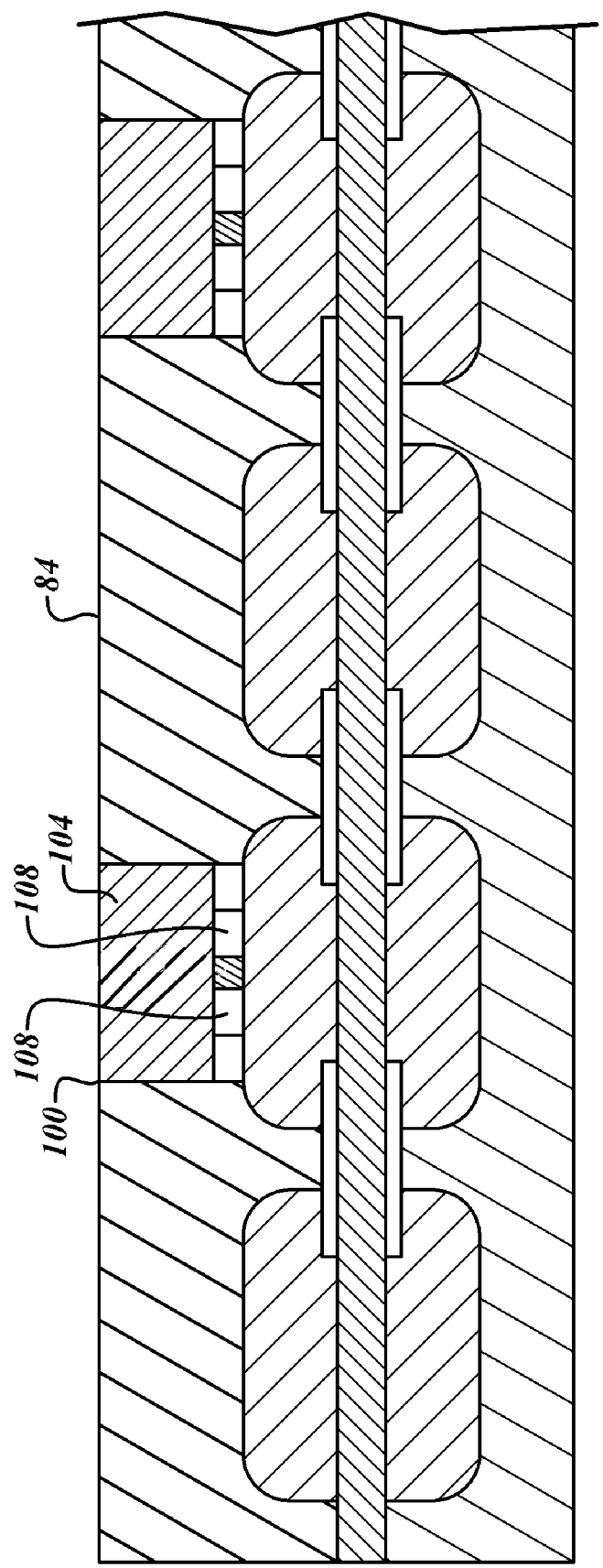

As shown in FIG. 7, another piece such as that described in the process shown in FIGS. 2-5 is attached to an opposing side of the device layer 94 in the same manner as that shown and described in FIG. 6. The other piece may have a larger base section 84. Next as shown in FIG. 8, cavities 100 are formed in the larger of the two base sections 84 between two mesas 82. In one embodiment, the cavities 100 are formed using a dicing saw. In another embodiment, the base section 84 is not included or removed from the piece prior to being attached to the device layer 94. Separate pieces of substrate (e.g., Kovar®) are machined and bonded to both ends of the magnet. The substrate magnet assembly is then bonded to the device layer.

Then, a magnet 104 is inserted into each of the cavities 108 with the magnets being attached to the glass material 86. An example method of attaching a magnet is disclosed in U.S. patent application No. 5,856,772, issued Jan. 5, 1999, which is hereby incorporated by reference.

Figure 9:
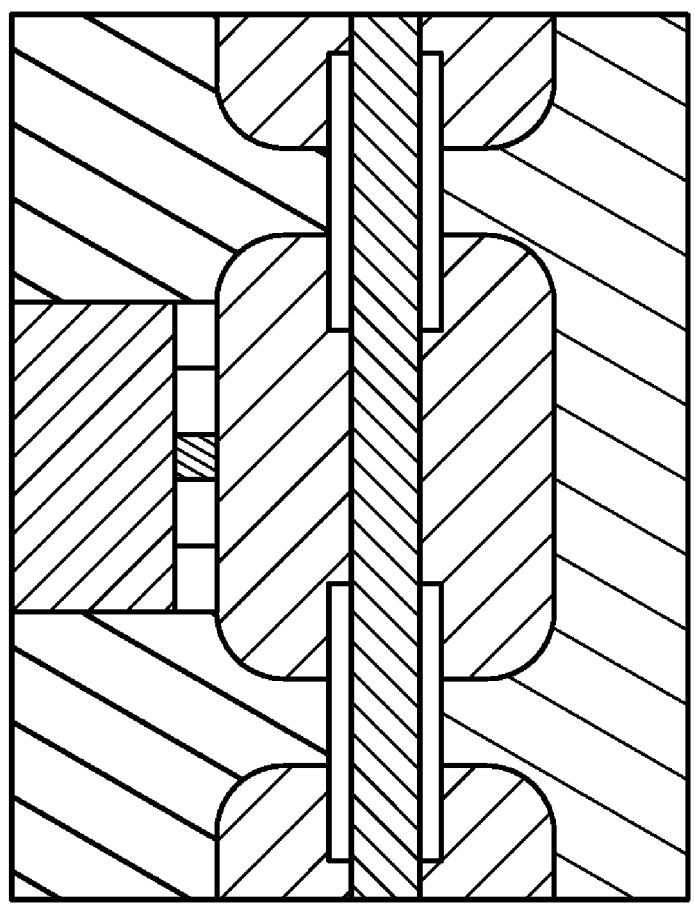

Now that wafer level manufacturing steps have been completed, the wafer is diced using a dicing process in order to separate the wafer into individual translational MEMS accelerometer packages 120, see FIG. 9. The packages 120 are then mountable onto a desired device, such as a circuit board.

Example thickness for the device layer 94 is 50 microns. Example height for a base of the substrate 84 is 3 mm and an example height for the mesas 82 is approximately 0.25 mm with the gap that is etched into the glass material 86 between the device layer 94. This makes the entire thickness approximately 7 mm.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A translational, Micro-Electro-Mechanical System (MEMS) accelerometer device comprising:
    a device layer comprising:
        a proof mass with a electrically conductive trace mounted on at least one side of the proof mass; and
        one or more frame components;
    a magnetic return path component attached to a first side of the device layer; and
    a magnet unit attached to a second side of the device layer, the magnet unit comprising:
        two magnetically conductive posts located proximate to the electrically conductive trace on the proof mass;
        a base section formed of the same material as the conductive posts;
        a non-magnetically conductive post connected between the conductive posts; and
        a magnet attached to the non-magnetically conductive post within a cavity formed in the base section between the two magnetically conductive posts;
    wherein the two magnetically conductive posts and the base section comprise a ferrous material and the non-magnetically conductive post comprise a glass substrate.

2. The device of claim 1, wherein the magnetic return path component comprises:
    two magnetically conductive posts located proximate to the electrically conductive trace on the proof mass;
    a base section formed of the same material as the conductive posts of the magnetic return path component; and
    a non-magnetically conductive post connected between the conductive posts of the magnetic return path component,
    wherein the two magnetically conductive posts of the magnetic return path component and the base section comprise a ferrous material and the non-magnetically conductive posts of the magnetic return path component comprise a glass substrate.

3. The device of claim 2, wherein the glass substrates comprise Pyrex®.

4. The device of claim 2, wherein the ferrous materials comprise Kovar®.

5. The device of claim 2, wherein the non-magnetically conductive posts are anodically bonded to predefined locations on the device layer.

6. The device of claim 2, wherein a top surface of the magnetically conductive posts of the magnet unit and of the magnetic return path component are recessed from a plane of a top surface of the non-magnetically conductive posts.

* * * * *